(12) United States Patent
Liu et al.

(10) Patent No.: US 12,514,941 B2
(45) Date of Patent: Jan. 6, 2026

(54) PORTABLE ULTRAVIOLET STERILIZATION CASE FOR ULTRASONIC PROBE

(71) Applicant: Lumicare Medtech Co., Ltd., Guangdong (CN)

(72) Inventors: Tong Liu, Guangdong (CN); Andrew Kobylinski, Guangdong (CN); Matt Hollier, Guangdong (CN)

(73) Assignee: Lumicare Medtech Co., Ltd., Guangdong (CN)

( * ) Notice: Subject to any disclaimer, the term of this patent is extended or adjusted under 35 U.S.C. 154(b) by 445 days.

(21) Appl. No.: 18/011,846

(22) PCT Filed: Nov. 11, 2020

(86) PCT No.: PCT/CN2020/128217
§ 371 (c)(1),
(2) Date: Dec. 21, 2022

(87) PCT Pub. No.: WO2022/036886
PCT Pub. Date: Feb. 24, 2022

(65) Prior Publication Data
US 2023/0248861 A1    Aug. 10, 2023

(30) Foreign Application Priority Data

Aug. 20, 2020  (CN) .......................... 202021752933.3

(51) Int. Cl.
*A61L 2/10*    (2006.01)
*A61B 8/00*    (2006.01)
(Continued)

(52) U.S. Cl.
CPC .............. *A61L 2/10* (2013.01); *A61B 8/4422* (2013.01); *A61L 2/26* (2013.01); *A61L 2202/11* (2013.01);
(Continued)

(58) Field of Classification Search
CPC .......... A61L 2/10; A61L 2/26; A61L 2202/11; A61L 2202/122; A61L 2202/16;
(Continued)

(56) References Cited

U.S. PATENT DOCUMENTS 5,160,699 A * 11/1992 Siegal ........................ A61L 2/10
                                                        250/455.11
6,490,351 B1 * 12/2002 Roberts ..................... A61L 2/10
                                                        379/439
(Continued)

FOREIGN PATENT DOCUMENTS

CN        209695883 U     11/2019
CN        110813845 A      2/2020
(Continued)

OTHER PUBLICATIONS

International Search Report of PCT Patent Application No. PCT/CN2020/128217 issued on Apr. 26, 2021.

*Primary Examiner* — Sean M Luck
(74) *Attorney, Agent, or Firm* — JEEN IP LAW, LLC (57) ABSTRACT

This invention relates to the technology of sterilizing medical ultrasonic probes, and discloses a portable ultraviolet sterilization case for ultrasonic probe, which includes a sterilization container for disinfecting and storing the ultrasonic probe, and a fixing clamp set configured to the interior of the sterilization container, wherein pairs of clamps trap the ultrasonic probe stably by an elastic structure. Hence the ultrasonic probe can be placed without colliding with the inner wall of the container.

11 Claims, 7 Drawing Sheets

(51) Int. Cl.
*A61L 2/26* (2006.01)
*B08B 7/02* (2006.01)

(52) U.S. Cl.
CPC ..... *A61L 2202/122* (2013.01); *A61L 2202/16* (2013.01); *A61L 2202/24* (2013.01); *B08B 7/028* (2013.01)

(58) Field of Classification Search
CPC ....... A61L 2202/24; B08B 3/12; B08B 7/028; A61B 8/4422
See application file for complete search history.

(56) References Cited

U.S. PATENT DOCUMENTS

| | | | | |
|---|---|---|---|---|
| 8,357,330 | B1* | 1/2013 | Erdlen | A61L 2/10 422/23 |
| 8,389,956 | B2* | 3/2013 | Rife | A61L 2/10 422/1 |
| 8,633,454 | B2* | 1/2014 | Durkin | A61L 2/10 248/102 |
| 8,636,950 | B2* | 1/2014 | Deshays | A61L 2/10 422/186.3 |
| 8,729,501 | B2* | 5/2014 | Ogawa | A61L 2/10 250/455.11 |
| 8,770,881 | B2* | 7/2014 | Dam | A61L 2/18 401/10 |
| 8,837,714 | B1* | 9/2014 | Chen | H04R 1/12 379/439 |
| 8,911,677 | B2* | 12/2014 | Gerstner | A61B 50/30 206/370 |
| 9,114,184 | B2* | 8/2015 | Messina | A61L 2/10 |
| 9,492,574 | B2* | 11/2016 | Rasooly | A61L 2/10 |
| 9,731,040 | B2* | 8/2017 | Dam | A61L 2/18 |
| 9,839,707 | B2* | 12/2017 | Won | A61L 2/10 |
| 9,855,351 | B2* | 1/2018 | Kim | H04R 1/028 |
| 9,872,556 | B2* | 1/2018 | Levy | A46B 7/023 |
| 9,987,384 | B2* | 6/2018 | Levy | A45C 15/06 |
| 10,058,169 | B2* | 8/2018 | Gorelick | A46B 17/065 |
| 10,186,884 | B2* | 1/2019 | Kim | F21V 7/066 |
| 10,279,059 | B2* | 5/2019 | Bettles | A61L 2/10 |
| 10,342,884 | B2* | 7/2019 | Bettles | A61L 2/10 |
| 10,456,512 | B2* | 10/2019 | Kim | A61M 1/062 |
| 10,493,176 | B2* | 12/2019 | McCormick | A61L 2/10 |
| 10,543,289 | B2* | 1/2020 | Taboada | A61L 2/10 |
| 2002/0162972 | A1* | 11/2002 | Pleet | A61B 90/70 250/492.1 |
| 2004/0099812 | A1* | 5/2004 | Humphreys | A61L 2/04 250/455.11 |
| 2006/0147339 | A1* | 7/2006 | Hunter | A61L 2/10 250/455.11 |
| 2006/0175554 | A1* | 8/2006 | Riddell | A61L 2/10 250/455.11 |
| 2008/0067418 | A1* | 3/2008 | Ross | A61L 2/24 250/455.11 |
| 2008/0265179 | A1* | 10/2008 | Havens | A61L 2/10 250/492.1 |
| 2010/0044582 | A1* | 2/2010 | Cooper | A61L 2/10 250/455.11 |
| 2012/0107184 | A1* | 5/2012 | Asiyanbola | A61L 2/24 422/291 |
| 2013/0004367 | A1* | 1/2013 | Roberts | A61L 2/10 250/504 R |
| 2014/0217307 | A1* | 8/2014 | Messina | A61L 2/26 250/455.11 |
| 2014/0341777 | A1* | 11/2014 | Deshays | G01J 1/429 250/354.1 |
| 2016/0114066 | A1* | 4/2016 | Lichtblau | A61L 2/10 250/455.11 |
| 2016/0249794 | A1* | 9/2016 | Suzuki | B08B 3/08 134/169 C |
| 2016/0271284 | A1* | 9/2016 | Lichtblau | A61L 2/10 |
| 2016/0302567 | A1* | 10/2016 | Gorelick | A46B 17/065 |
| 2016/0324996 | A1* | 11/2016 | Bilenko | A61L 2/24 |
| 2016/0324997 | A1* | 11/2016 | Dayton | A61L 2/10 |
| 2017/0095584 | A1* | 4/2017 | Martz | A61L 2/24 |
| 2017/0100495 | A1* | 4/2017 | Shur | G01N 27/121 |
| 2019/0022263 | A1* | 1/2019 | Quilici | F21V 21/30 |
| 2019/0167827 | A1* | 6/2019 | Gaska | A61L 2/10 |
| 2019/0200424 | A1* | 6/2019 | Mochizuki | H05B 45/56 |

FOREIGN PATENT DOCUMENTS

| | | |
|---|---|---|
| CN | 210386714 U | 4/2020 |
| CN | 211160868 U | 8/2020 |

\* cited by examiner

PORTABLE ULTRAVIOLET STERILIZATION CASE FOR ULTRASONIC PROBE

FIELD

The subject matter herein generally relates to the technology of disinfecting medical ultrasonic probes, and particularly to a portable ultraviolet sterilization case for ultrasonic probe, which can efficiently fix the medical ultrasonic probe.

BACKGROUND

Medical ultrasonic probe is a medical apparatus that make direct contact with the human body. In some cases, a low-level sterilization for ultrasonic probe is required after the probe touched the healthy skin of human body. However, certain occasions as the probe touches mucosal tissues, or unhealthy, damaged epidermis of human body may require a high-level sterilization.

At present, there are four methods for high-level sterilization of medical ultrasonic probes:
- chemical immersion method is to immerse the ultrasonic probe into the sterilization solution. The problem existing in that the solution may damage the probe surface and cause harm to the skin of operators and patients who come into contact with the probe. Moreover, the discarded chemicals may pollute the environment;
- atomizing hydrogen peroxide sterilization method is to place the probe in the atomized hydrogen peroxide for disinfection. The problem existing in that the residues of chemical reagents may harm operators and patients;
- the surface wiping method is to wipe the probe surface with wet wipes soaked with disinfectant fluid for disinfection. The problem existing in that manual wiping cannot ensure the disinfection of the surface are even, and the disinfection effect is difficult to control. Moreover, consumables such as disinfection towels may cause environmental pollution;
- the ultraviolet irradiation method uses ultraviolet light with a specific wavelength range to uniformly irradiate the probe surface to achieve high-level disinfection. However, the commonly used UV light source is a gas discharge lamp, which has the disadvantage that the glass cover of the lamp is easy to be damaged, and the internal gas leakage may harm operators and pollutes the atmosphere.

Although there are various disinfection means and methods for medical ultrasonic probes, there are always many defects in omnidirectional disinfection and stable placement of medical ultrasonic probes that need to be improved.

SUMMARY

A portable ultraviolet sterilization case for ultrasonic probe, provides omnidirectional ultraviolet light sources disinfection and stable placement for medical ultrasonic probes, comprising:
- a sterilization container, wherein a disinfection device is arranged inside for disinfecting the ultrasonic probe horizontally and vertically;
- a fixing clamp set arranged on the interior of the sterilization container, wherein pairs of clamps trap the ultrasonic probe stably by an elastic structure.

The technical effect shows that the sterilization container is both for disinfecting and storing the ultrasonic probe, with a fixing clamp set configured to the interior of the sterilization container, wherein pairs of clamps trap the ultrasonic probe stably by an elastic structure. Hence the ultrasonic probe can be placed without colliding with the inner wall of the container In the portable ultraviolet sterilization case for ultrasonic probe, a fixing clamp set comprises a supporting structure, pairs of clamps, and an elastic structure (including elastic materials); The supporting structure and pairs of clamps are connected by the elastic structure (including elastic materials); The support structure can be fit into the interior of the sterilization container.

The technical effect shows that the supporting structure and pairs of clamps are connected by the elastic structure (including elastic materials), so that pairs of clamps trap the ultrasonic probe by the pressure generated from the elastic structure; meanwhile, the supporting structure can be properly placed in or taken out from the sterilization container for cleaning conveniently.

In the portable ultraviolet sterilization case for ultrasonic probe, a fixing clamp set includes a plurality of pairs of clamps configured oppositely to the supporting structure.

The technical effect shows that pairs of clamps oppositely configured to the internal beam of the support structure can clamp the ultrasonic probe more stably and fix the ultrasonic probe in the middle of the sterilization container, thus avoiding the probe from displacement or collision, and successfully accepting ultraviolet disinfection.

In the portable ultraviolet sterilization case for ultrasonic probe, pairs of clamps comprise oppositely arranged big clamps, and small clamps arranged below the big pair.

The technical effect shows that, the ultrasonic probe is generally flat in shape, so to achieve effective protection and the ideal disinfection level of the ultrasonic probe, the big clamps are arranged to stably trap the large part of the ultrasonic probe, and the small clamps can support the small part of the ultrasonic probe to avoid direct contact with the bottom of the sterilization container.

In the portable ultraviolet sterilization case for ultrasonic probe, the opposite sides of the big clamps are provided with an internal concave, and the upward sides of the small clamps are provided with a concave downward.

The technical effect shows that the parts that the big clamps and the small clamps connected with the ultrasonic probe have internal concave, which is designed for better adapting to the protruding surfaces of most ultrasonic probes, and preventing the probe from being displaced inside the sterilization container. In this case, the probe can be placed into the fixing clamp set more safely and conveniently.

In the portable ultraviolet sterilization case for ultrasonic probe, pairs of clamps are made of ultraviolet transparent material.

The technical effect shows that the pairs of clamps made of ultraviolet transparent material may reduce the blocks for ultraviolet irradiation, the parts where the ultrasonic probe is in contact with the clamp can also be irradiated.

In the portable ultraviolet sterilization case for ultrasonic probe, ultraviolet sterilization sources (such as UVC LED, low-pressure mercury lamps, etc.) are arranged on the interior wall of the sterilization container evenly.

The technical effect shows that the disinfection level of the ultrasonic probe by ultraviolet irradiation is determined by the illumination dose, which is the total time of illumination received by the irradiated surface. To meet the specified disinfection requirements for the ultrasonic probe, the surface of the probe with more uniform radiation will have higher disinfection efficiency. Hence, the ultraviolet light sources are evenly distributed on the inwall of the sterilization container, wherein the light-emitting lamps have a proper distance (0.5 cm-5 cm) from the probe surface. If the ultraviolet light source is a point lamp (for example, UVC LED lamp with corresponding lens in front), its light emitting angle is Φ, and the distance between the light source and the probe surface is D. The distance L between adjacent lamps which are in the same flat surface should not exceed 2D·tan Φ/2 for ensuring the probe is radiated evenly. For example, if the light emitting angle of the lamp is 120° and the distance between the lamp and the surface of the disinfected probe is 1 cm, the distance between adjacent lamp beads should not exceed 3.5 cm.

In the portable ultraviolet sterilization case for ultrasonic probe, a portable sterilization case for ultrasonic probe, sides of the inner wall of the sterilization container are made of ultraviolet reflecting material; a winding device is arranged on the outer side of the sterilization case.

The technical effect shows that for an ultrasonic probe with wire, a winding device can effectively accommodate the wired probe for the convenience of the medical workers.

In the portable ultraviolet sterilization case for ultrasonic probe, the present disclosure includes a sterilization system, comprising: a plurality of cases that can be used in combination, wherein the case is any ultraviolet sterilization case for ultrasonic probes mentioned above.

The technical effect shows that a slot structure is arranged on the sides of the ultraviolet sterilization case for ultrasonic probe, wherein the slot structure may connect with another portable ultraviolet sterilization case to form a case assembly.

In the portable ultraviolet sterilization case for ultrasonic probe, the case can be fixed on the bracket of an ultrasonic machine.

The technical effect shows that a slot structure is arranged on the back of the ultraviolet sterilization case, wherein the slot structure may connect with a plurality of portable ultraviolet sterilization cases to form a case assembly, and the case assembly may be fixed on the bracket of an ultrasonic machine. Hence as the ultrasonic probe is disinfected by ultraviolet light sources, the ultrasonic descaling process can as well function to enhance the cleaning and disinfection effect of the ultrasonic probe.

The present disclosure includes a sterilization case both for sterilizing and storing the probe; and a fixing clamp set is arranged on the interior of the sterilization case, wherein pairs of clamps trap the ultrasonic probe stably by an elastic structure. Hence the ultrasonic probe can be placed without colliding with the inner wall of the container.

BRIEF DESCRIPTION OF THE DRAWINGS

In order to clearly explain technical solutions of embodiments of the present disclosure or in the related art, drawings used in the description of the embodiments or the related art are briefly described below. Obviously, the drawings described below are merely some embodiments of the present disclosure. Based on these drawings, other drawings can be obtained by those skilled in the art without paying creative efforts.

DETAILED DESCRIPTION

In order to make the purpose, technical scheme and advantages of the present disclosure clearer, this invention will be further illustrated in detail with reference to the attached drawings and embodiments. The specific embodiments described here are only for explaining, not for limiting. In the description of the utility model, it should be noted that the directions or positional relationships indicated by the terms "center", "upper", "lower", "left", "right", "vertical", "horizontal", "inside" and "outside" are based on the directions or positional relationships shown in the drawings, which are only for the convenience of describing the utility model and simplifying the description.

In addition, in the description of this invention, unless be specified and limited, the terms "arrange", "connect" and "link" should be understood broadly. For example, they can be fixed, detachable, or integrated arranged; be mechanically or electrically connected; be directly or indirectly linked through an intermediate medium, or it can be connected internally between two elements, wirelessly or wired. For technicians in this field, the specific meanings of the above terms in this utility model can be understood according to specific conditions.

In addition, the technical features involved in different embodiments of this invention can be combined as long as there is no conflict between them.

The following are embodiments proposed as instruction for those skilled in the art to achieve according to the present disclosure.

Embodiment 1

Figure 1:
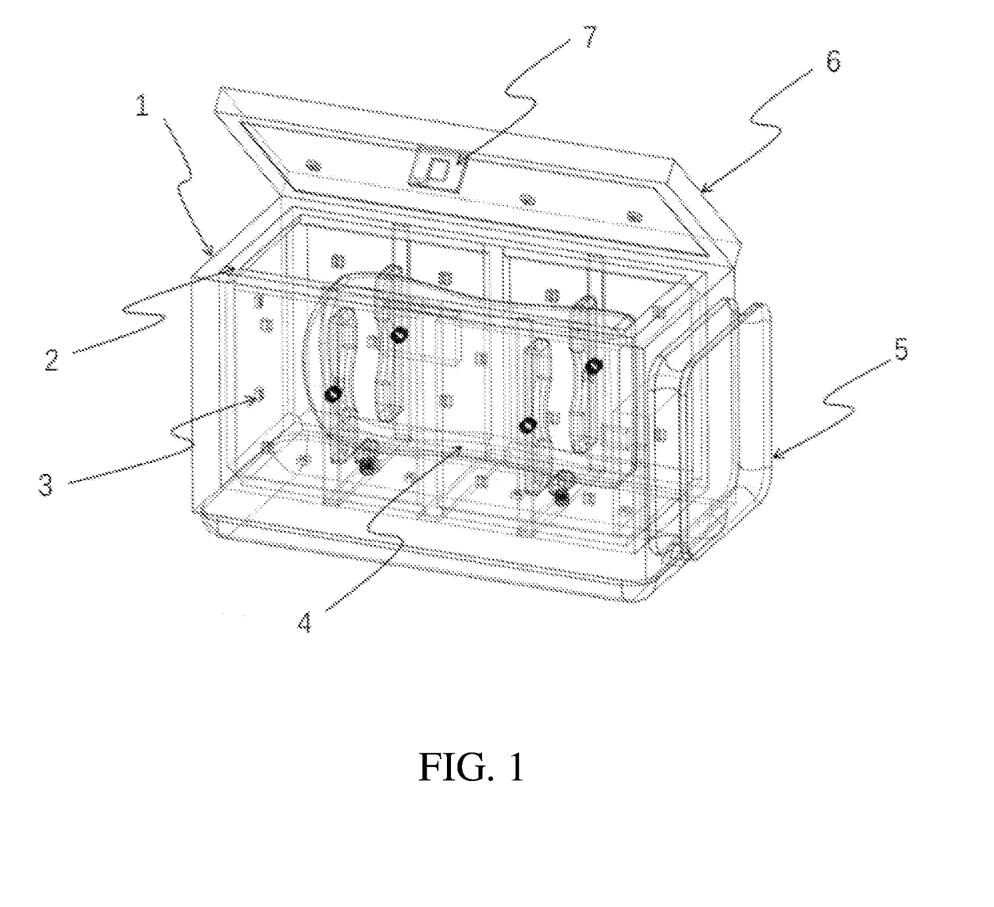
FIG. 1 is a schematic view of embodiment of a portable ultraviolet sterilization case for ultrasonic probe according to the present disclosure.
Figure 2:
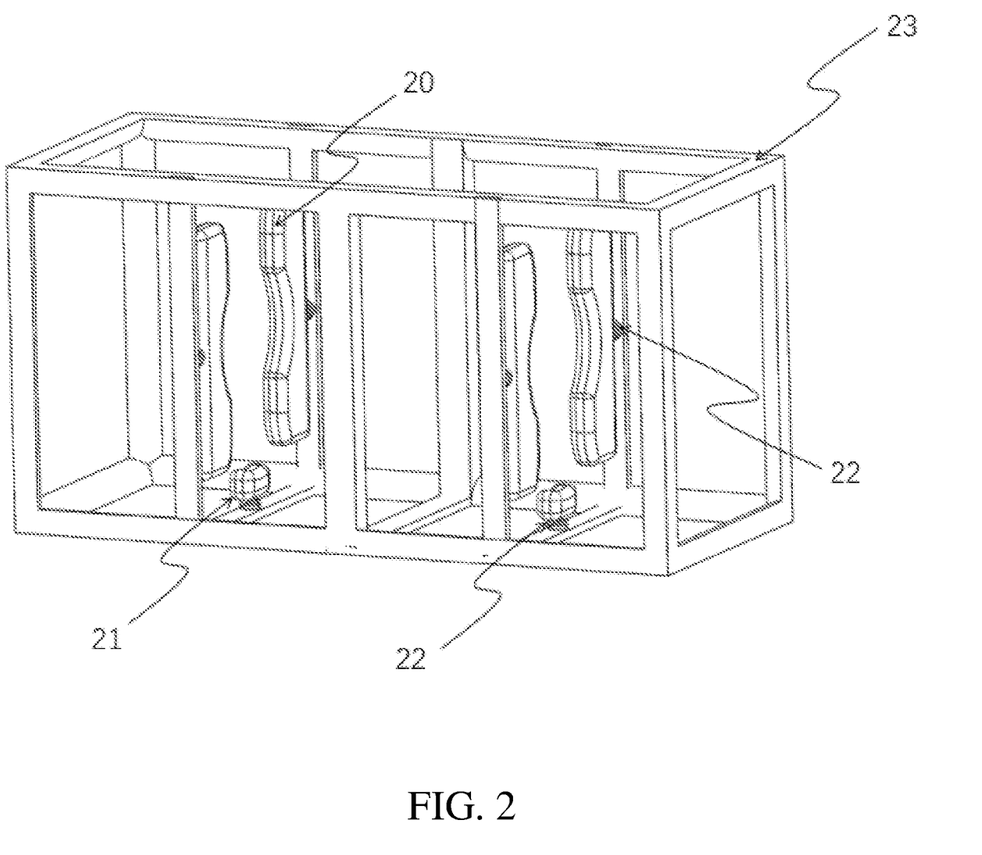
FIG. 2 is a schematic view of a clamping unit according to the present disclosure.

As shown in FIGS. 1 and 2, a portable ultraviolet sterilization case for ultrasonic probe, provides omnidirectional ultraviolet light sources disinfection and stable placement for medical ultrasonic probes, comprising:

a sterilization container 1, wherein a disinfection device is arranged inside for the omnidirectional disinfection of the ultrasonic probe;

a fixing clamp set 2 arranged on the interior of the sterilization container, wherein pairs of clamps trap the ultrasonic probe stably by an elastic structure.

The sterilization container 1 may both sterilize and store the probe 4. A fixing clamp s 2 is arranged on the interior of the sterilization case, wherein pairs of clamps 20 and 21 trap the ultrasonic probe 4 stably by an elastic structure. Hence the ultrasonic probe can be placed without colliding with the inner wall of the container.

Embodiment 2

As illustrated in FIG. 2, the fixing clamp set 2 includes:
a supporting structure 23;
pairs of clamps 20 and 21;
and an elastic structure (including elastic materials) 22.

The supporting structure 23 is connected with pairs of clamps 20 and 21 by an elastic structure (including elastic materials) 22; The support structure can be fit into the interior of the sterilization container.

It should be noted that the support structure 23 is connected with pairs of clamps 20 and 21 by an elastic structure (including elastic materials) 22, so that the clamp set 21 and 21 trap the ultrasonic probe 4 by the pressure generated from the elastic structure; meanwhile, the supporting structure 23 can be properly placed in or taken out from the sterilization container 1 for cleaning.

Embodiment 3

As illustrated in FIG. 2, pairs of clamps 20 and 21 include a plurality of pairs of clamps configured oppositely to the supporting structure.

It should be noted that pairs of clamps 20 and 21 oppositely configured to the internal beam of the support structure can clamp the ultrasonic probe 4 more stably and fix the ultrasonic probe 4 in the middle of the sterilization container, thus avoiding the probe from displacement or collision, and successfully accepting ultraviolet disinfection.

Embodiment 4

As illustrated in FIGS. 1 and 2, the small clamps 21 are arranged below the big clamps 20.

It should be noted that, considering that the ultrasonic probe 4 is generally flat in shape, so to achieve effective protection and the ideal disinfection level of the ultrasonic probe, the big clamps 20 are arranged to stably clamp the large part of the ultrasonic probe, and the small clamps 21 can support the small part of the ultrasonic probe 4 to avoid direct contact with the bottom of the sterilization container 1, thus to achieve effective protection and the ideal disinfection result of the ultrasonic probe 4.

Embodiment 5

As illustrated in FIG. 2, the opposite sides of the big clamps 20 are provided with an internal concave, and the upward sides of the small clamp set 21 are provided with a concave downward.

It should be noted that the contact parts between pairs of clamps 20 and 21 and the ultrasonic probe have internal concave, which is designed for better adapting to the protruding surfaces of most ultrasonic probes 4, and preventing the ultrasonic probe 4 from being displaced inside the sterilization container. In this case, the probe can be placed into the fixing clamp set 2 more safely and conveniently.

Embodiment 6

As illustrated in FIG. 2, pairs of clamps 20 and 21 are made of ultraviolet transparent material.

It should be noted that the pairs of clamps 20 and 21 made of ultraviolet transparent material may reduce the blocks for ultraviolet rays, the parts where the ultrasonic probe is in contact with the clamp can also be irradiated.

Embodiment 7

As illustrated in FIG. 1, ultraviolet light sources (such as UVC LED lamps) 3 are uniformly distributed on the inner wall of the sterilization container 1.

It should be noted that the disinfection level of ultrasonic probe by ultraviolet irradiation is determined by the illumination dose, which is the total time of illumination received by the irradiated surface. In order to meet the specified disinfection requirements for ultrasonic probe, the surface of the probe with more uniform radiation will have higher disinfection efficiency.

Embodiment 8

Figure 3:
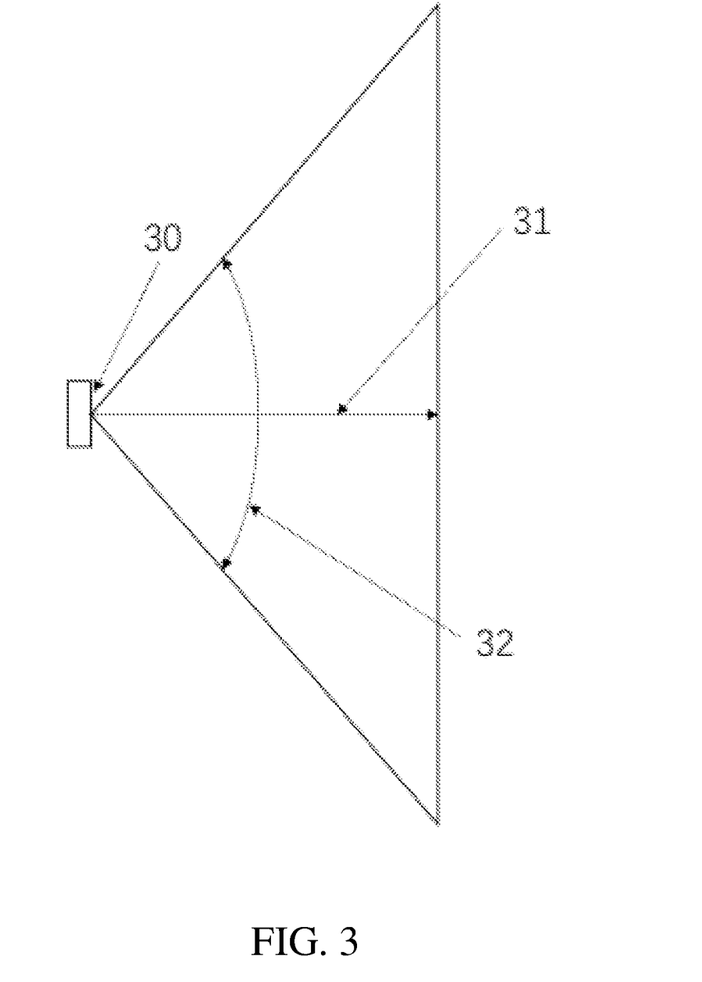
FIG. 3 is a schematic view of the light emitting angle of a point light source (such as UVC LED lamps) according to the present disclosure.
Figure 4:
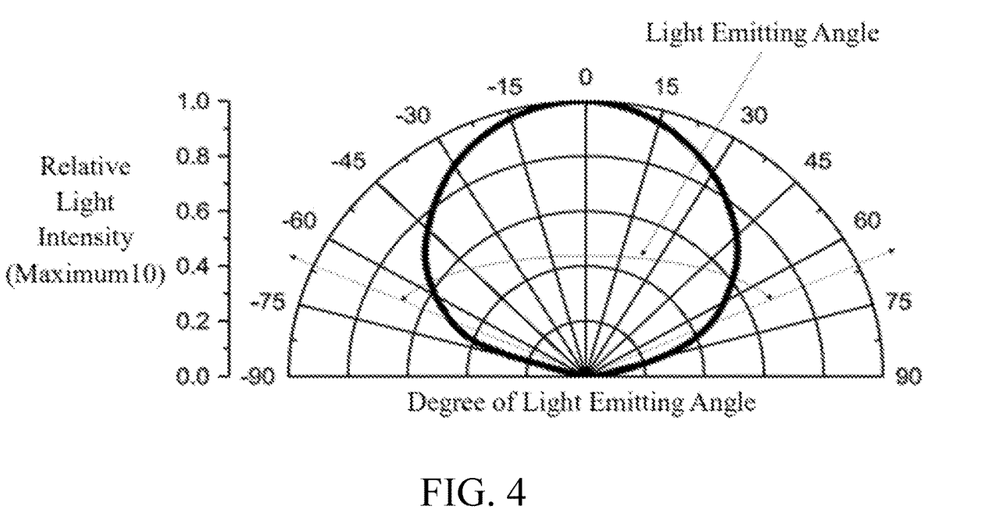
FIG. 4 illustrates the light emitting angle of a point light source (such as UVC LED lamps) with specific data according to the present disclosure.

As illustrated in FIGS. 3 and 4, a schematic view of the light emitting angle of a point light source (such as UVC LED lamps) according to the present disclosure, wherein 30 is the emitting plane of the point light source (e.g., UVC LED lamps), 31 is the normal direction of light, and 32 is the light emitting angle $\Phi$.

It should be noted that the ultraviolet light sources are evenly distributed on the inwall of the sterilization container, wherein the light-emitting lamps have proper distance (0.5 cm-5 cm distance) from the probe surface. If the ultraviolet light source is a point lamp (for example, UVC LED lamp with corresponding lens in front), its light emitting angle is $\Phi$, and the distance between the light source and the probe surface is D. The distance L between adjacent lamps which are in the same flat surface should not exceed $2D \cdot \tan\Phi/2$ for ensuring the probe are radiated evenly. For example, if the light emitting angle of the lamp is 120° and the distance between the lamp and the surface of the disinfected probe is 1 cm, the distance between adjacent lamp beads should not exceed 3.5 cm.

Embodiment 9

As illustrated in FIG. 1, a winding device 5 is arranged on the outer side of sterilization case 1.

It should be noted that for an ultrasonic probe with wire, winding device 5 can effectively accommodate the wired probe for the convenience of the medical workers.

Embodiment 10

Figure 5:
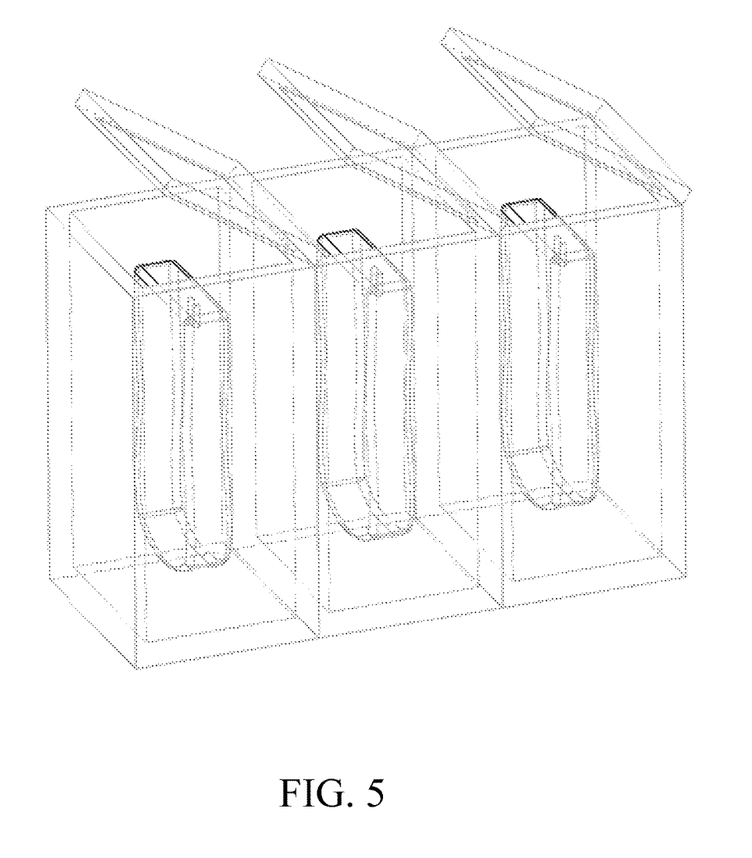
FIG. 5 is a schematic view of an ultrasonic system according to the present disclosure.

As illustrated in FIG. 5, this invention includes a sterilization system, comprising: a plurality of cases that can be used in combination, wherein the case is any ultraviolet sterilization case for ultrasonic probe mentioned above.

It should be noted that a slot structure is arranged on the sides and back of the ultraviolet sterilization case for ultrasonic probe, wherein the slot structure may connect with another portable ultraviolet sterilization case to form a case assembly.

Further, the case may be fixed on the bracket of an ultrasonic machine.

The technical effect shows that a slot structure is arranged on the back of the ultraviolet sterilization case for ultrasonic probe, wherein the slot structure may connect with a plurality of portable ultraviolet sterilization cases to form a case assembly, and the case assembly may be fixed on the bracket of an ultrasonic machine. Hence as the ultrasonic probe is being disinfected by ultraviolet light sources, the ultrasonic descaling process may as well function to enhance the cleaning and disinfection effect of the ultrasonic probe without pulling out the probe from the ultrasonic machine.

Embodiment 11

Figure 6:
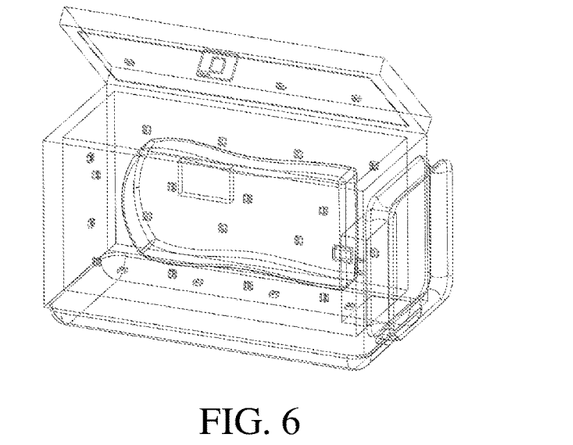
FIG. 6 is a schematic view of a narrow side of the probe parallel to the container cover being placed in the sterilization container according to the present disclosure.
Figure 7:
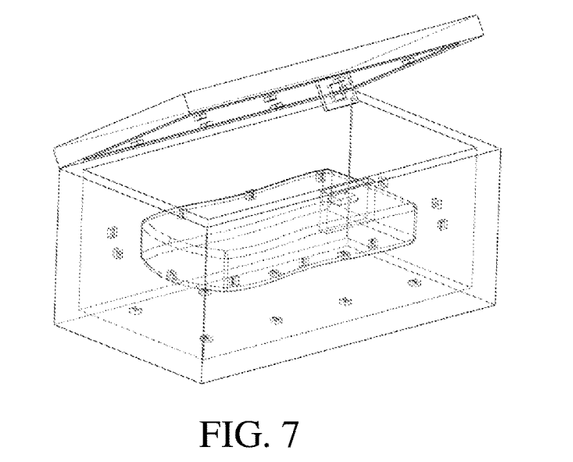
FIG. 7 is a schematic view of a side of the probe parallel to the container cover being placed into the sterilization case according to the present disclosure.
Figure 8:
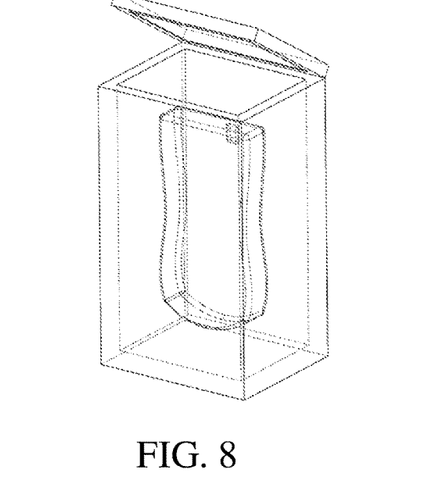
FIG. 8 is a schematic view of a side of the probe being placed vertically into the sterilization case according to the present disclosure.

As shown in FIGS. 6-8, there are at least three ways to place the ultrasonic probe into the sterilization case:
FIG. 6 presents a narrow side of the probe parallel to the container cover is being placed into the sterilization case;
FIG. 7 presents a side of the probe parallel to the container cover is being placed into the sterilization case;
and FIG. 8 presents a side of the probe is being placed vertically into the sterilization case.

Embodiment 12

Figure 9:
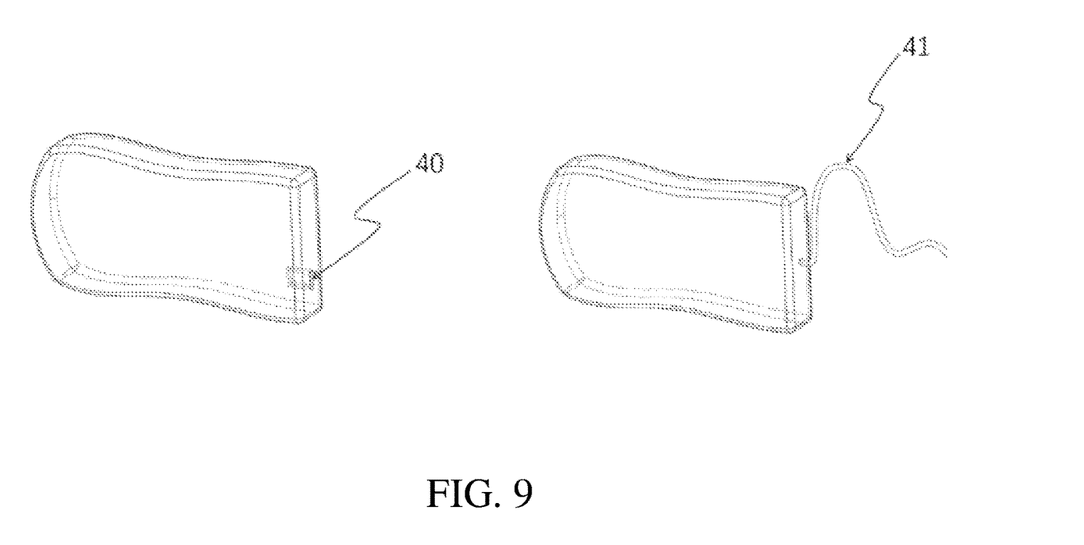
FIG. 9 is a schematic view of two common portable probes according to the present disclosure.

As shown in FIGS. 1 and 9, there are two types of ultrasonic probe 4: a wireless probe with a charging port, and a wired probe with a probe cable.

It should be noted that the wireless probe with a charging port has a charging port 40, and the wired probe with a probe cable has a probe cable 41.

Embodiment 13

As shown in FIG. 1, a buckle 7 is configured to the cover of the portable ultraviolet sterilization case for ultrasonic probe, which will prevent the cover from accidentally opening during carrying or moving.

Embodiment 14

As shown in FIG. 1, the fixing clamp set 2 of this invention has a pressure sensor, wherein the pressure sensor may inform the sterilization case whether the ultrasonic probe 4 has been placed in the fixing clamp set 2; a pressure sensor is also arranged on case cover 6. Hence when the case cover 6 is closed, the disinfection process may automatically begin.

Embodiment 15

Figure 10:
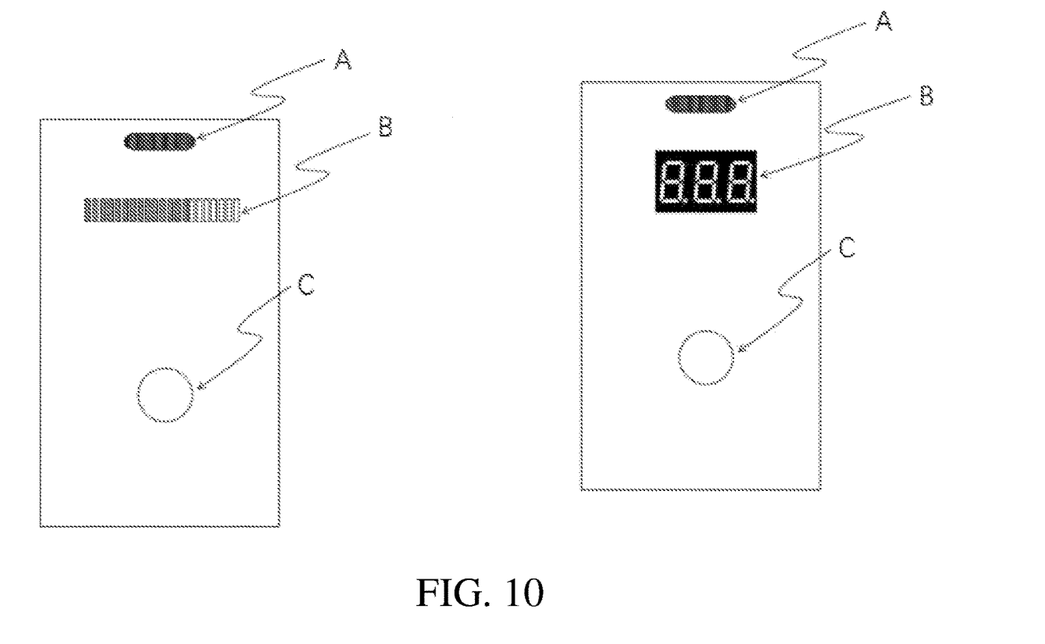
FIG. 10 is a schematic view of an operation panel according to present disclosure.

FIG. 10 is a possible indicator for displaying the current disinfection status. It is divided into three parts:
A is the disinfection status indicator with color backlight;
B is the progress bar for showing the disinfection status;
and C is the disinfection button.

The left indicator shows the current status of disinfection in the form of a progress bar, and the right indicator shows it by changeable light color or texts, such as there is/isn't a probe in the disinfection box, the disinfection process is finished and the probe can be taken out, or the disinfection box is malfunctioning.

It should be noted that when the ultrasonic probe 4 is placed in the ultraviolet sterilization case and the case cover 6 is closed, the case may operate the disinfection by pressing the button C. The disinfection progress will be displayed on the disinfection status indicator. When the sterilization dose reaches the required threshold, the process finished automatically.

Embodiment 16

As illustrated in FIG. 1, a photoelectric measurement system is arranged on the inner wall of the sterilization container 1, wherein the photoelectric measurement system can detect the disinfection dose of ultraviolet radiation, and automatically stop the disinfection process once measuring that the disinfection dose has reached the required threshold.

Embodiment 17

As shown in FIG. 10, a user setting is arranged on the indicator. In the case that the disinfection process is finished and the probe is still inside the case, by the time interval set according to the user, the disinfection case can be automatically disinfected again after a certain interval to maintain the disinfection effect of the probe.

Embodiment 18

Figure 11:
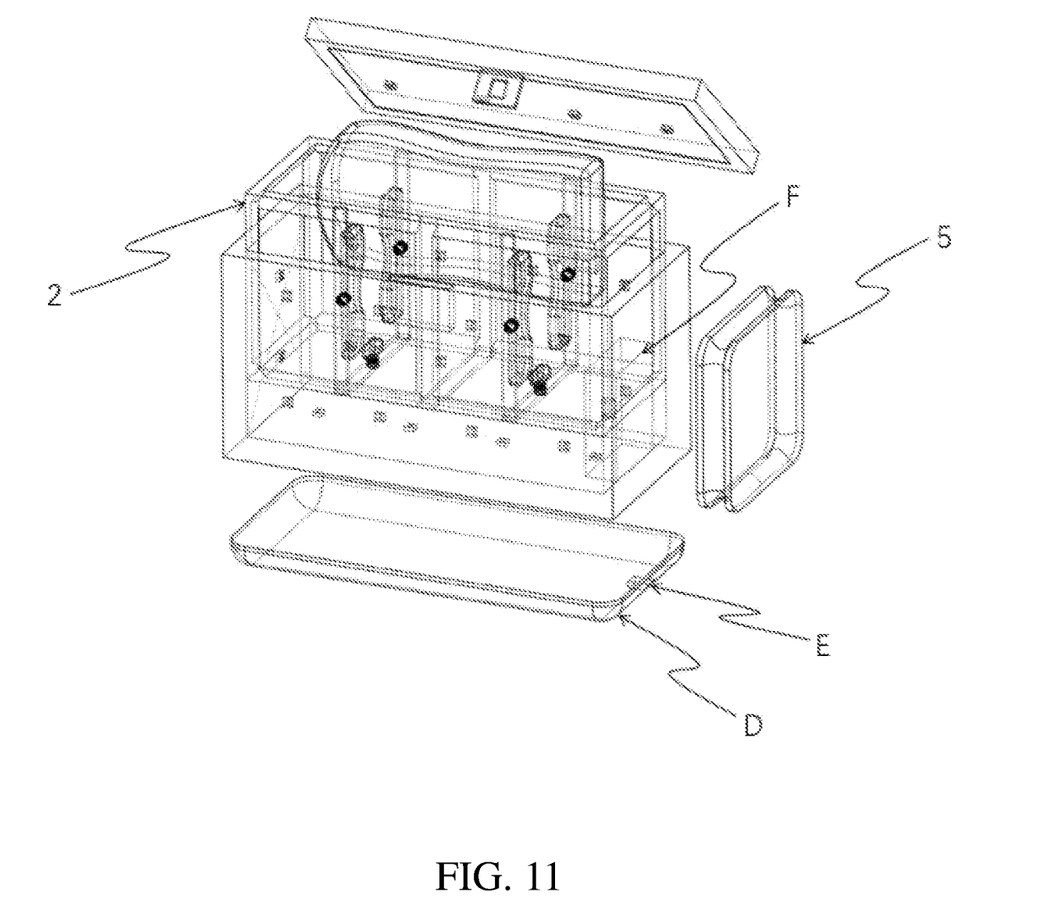
FIG. 11 is an exploded view of a portable ultraviolet sterilization case for ultrasonic probe according to the present disclosure.

FIG. 11 is an exploded view of a portable ultraviolet sterilization case for ultrasonic probe, wherein a battery compartment is D, an interface for the charging and discharging device is E, and the charging device of the ultrasonic probe is F.

Embodiment 19

As shown in FIG. 1, a microthermal printer is connected to the ultraviolet sterilization case for printing disinfection results.

Embodiment 20

As shown in FIG. 11, a USB or other similar ports may be arranged inside the sterilization case to connect with a U disk to export disinfection records, an external thermal printer with a USB to print disinfection results is also acceptable.

Embodiment 21

As shown in FIG. 11, a built-in WI-FI is arranged in the sterilization case to connect with a thermal printer with WI-FI emitting function to print disinfection results, computers in the same LAN to browse/export disinfection records is also acceptable.

In conclusion, this invention relates to the technology of sterilizing medical ultrasonic probes, and discloses a portable ultraviolet sterilization case for ultrasonic probe. The portable ultraviolet sterilization case for ultrasonic probe may include a sterilization container, used not only to disinfect the probe, but also as a storage space for the disinfection probe, and an elastic clamping unit configured to the interior of the sterilization container, wherein sets of clamps traps the ultrasonic probe stably by its flexible contractile structure. Hence the ultrasonic probe can be placed without colliding with the inner wall of the container.

What is claimed is:
1. A portable ultraviolet sterilization case for ultrasonic probe, comprising:

a sterilization container, wherein a disinfection device is arranged inside for omnidirectional disinfection of the ultrasonic probe;

a fixing clamp set arranged on interior of the sterilization container, wherein pairs of clamps trap the ultrasonic probe stably by an elastic structure;

a plurality of ultraviolet light sources are arranged on an interior wall of the sterilization container evenly, wherein a light emitting angle of the ultraviolet light source is Φ, and a distance between the ultraviolet light source and a surface of the ultrasonic probe is D, a distance L between adjacent ultraviolet light sources is less than or equal to $$2D \cdot \tan\frac{\Phi}{2}.$$

2. The portable ultraviolet sterilization case for ultrasonic probe according to claim 1, wherein the fixing clamp set comprises a supporting structure, the pairs of clamps and the elastic structure; wherein the supporting structure and the pairs of clamps are connected by the elastic structure; the supporting structure fits into the sterilization container.

3. The portable ultraviolet sterilization case for ultrasonic probe according to claim 1, wherein the fixing clamp set arranged in the sterilization container is removable and fixable.

4. The portable ultraviolet sterilization case for ultrasonic probe according to claim 2, wherein the fixing clamp set includes a plurality of pairs of clamps configured oppositely to the supporting structure.

5. The portable ultraviolet sterilization case for ultrasonic probe according to claim 3, wherein the pairs of clamps include two clamps arranged oppositely with each other.

6. The portable ultraviolet sterilization case for ultrasonic probe according to claim 5, wherein a side of the clamp facing the ultrasonic probe is provided with internal concave.

7. The portable ultraviolet sterilization case for ultrasonic probe according to claim 1, wherein the pairs of clamps are made of ultraviolet transparent material.

8. A sterilization system, comprising:
a plurality of cases which are used in combination, wherein the case is the portable ultraviolet disinfection case for ultrasonic probe of claim 1.

9. The sterilization system according to claim 8, wherein the combined cases are fixed to a bracket of an ultrasonic machine.

10. A sterilization system, comprising:
a plurality of cases which are used in combination, wherein the case is the portable ultraviolet disinfection case for ultrasonic probe of claim 2.

11. A sterilization system according to claim 10, wherein the combined cases are fixed to a bracket of an ultrasonic machine.

* * * * *